United States Patent Office.

CURT AUGUST FISCHER, OF CHICAGO, ILLINOIS, ASSIGNOR OF THREE-FOURTHS TO ERASMUS B. COLLINS AND WILLIAM K. SWALLOW, BOTH OF SAME PLACE.

COMPOUND FOR RENDERING CLOTH WATER-PROOF.

SPECIFICATION forming part of Letters Patent No. 248,299, dated October 18, 1881.

Application filed August 2, 1881. (No specimens.)

*To all whom it may concern:*

Be it known that I, C. A. FISCHER, of Chicago, county of Cook, and State of Illinois, have invented certain Improvements in Compounds for Rendering Cloth Water-Proof, of which the following is a specification.

The object of my invention is to render textile fabrics or other cloth impervious to water, and at the same time supple, soft, and smooth, and not liable to crack or break from either heat or cold. I have accomplished this object by making a compound of the following ingredients, in about the proportion hereinafter stated, viz: first, one gallon of linseed-oil; second, one pound of Irish moss or carrageen-moss; third, five ounces of pulverized pumice-stone; fourth, five ounces of soda; fifth, five ounces of burnt umber; sixth, ten ounces of red lead; seventh, eight ounces of litharge; eighth, six ounces of acetate of lead; and, ninth, four ounces of copperas; and the process of combining the said ingredients in order to produce the best results is substantially as follows, viz: The linseed-oil and Irish moss are first put in the same vessel together and heated to 320° Fahrenheit and kept steadily at that temperature for one hour, and then will be allowed to cool down to 280°, when the Irish moss will be removed from the vessel, and then will be put into the same the pulverized pumice-stone, the soda, and the burnt umber, which must be first heated up to 120° before being put in, and then the whole will be heated up to 320° again, and then will be added the red lead, acetate of lead, litharge, and the copperas, and then the temperature of the whole compound will be raised to such a degree of temperature that a stick of dry wood when inserted into the mass will be partially charred in thirty seconds without blazing, and then it will be cooked at that degree for three hours, and then, upon being allowed to cool, it will be fit for use. It may, however, be colored as desired by heating the pigment to 100° and stirring it into the compound; but no claim is made for coloring.

My process of applying the said compound, after it has become cool enough to be handled, to the cloth is essentially as follows: I make use of a flexible smooth plate of suitable metal as an instrument for spreading the compound on the cloth; but I make no claim herein for such an instrument. By means of this instrument in the hand of the operator the compound is spread evenly upon the cloth and thoroughly forced into its texture, and all lumps are crushed, and when a coat of the pound has been completed and allowed to dry, then a slab of pumice-stone is used to thoroughly rub the same in connection with a wash made of soda and water, and wash it thus clean of all foreign matters, especially of sand; and then, if it be desired to put on a second coat, the first will be allowed to dry after being so washed, and the second coat will be washed in like manner with the first, and then allowed to dry before a third coat is applied, and so on for as many coats as may be desired; and only one or both sides of the cloth may be coated.

What I claim as new, and desire to secure by Letters Patent, is—

1. The described compound, made up of the linseed-oil, Irish moss, pulverized pumice-stone, soda, burnt umber, red lead, litharge, acetate of lead, and copperas, substantially in the proportions set forth, for the purpose described.

2. The described process of compounding the said ingredients, consisting, essentially, of heating the linseed-oil and Irish moss together up to 320° Fahrenheit and keeping them at that temperature for one hour, and then allowing them to cool down to 280°, removing the Irish moss, and adding the pulverized pumice-stone, the soda, and burnt umber, after being themselves heated up to 120°, then heating the whole up to 320° again, then adding the red lead, acetate of lead, litharge, and copperas, and then raising the whole to such a degree of heat that when a stick of dry wood is inserted into the mass and held there for thirty seconds it will be partially charred without blazing, and cooked for three hours at that temperature, substantially as described.

3. The described process of applying the said compound to the cloth, consisting, essentially, of spreading the same upon it in one or more successive coats by means of a supple plate of suitable metal and working the same thoroughly and evenly into the texture of the cloth, and then, after each coat shall become dry, washing it with a wash of soda and water by the use of a slab of pumice-stone, and then allowing it to dry again before applying another coat, substantially as set forth.

CURT AUGUST FISCHER.

Witnesses:
D. W. MANHALL,
JOHN V. HAIR.